Aug. 18, 1925.                                                                    1,550,015
H. L. DECKER
INSTRUMENT MOUNTING MEANS
Filed April 23, 1924
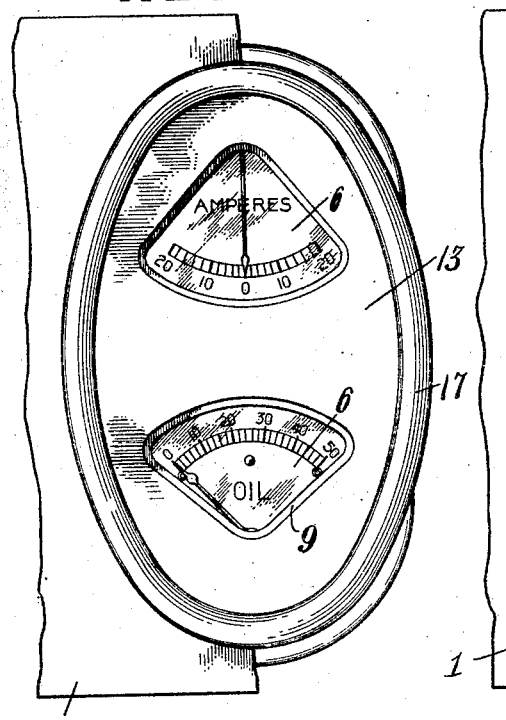
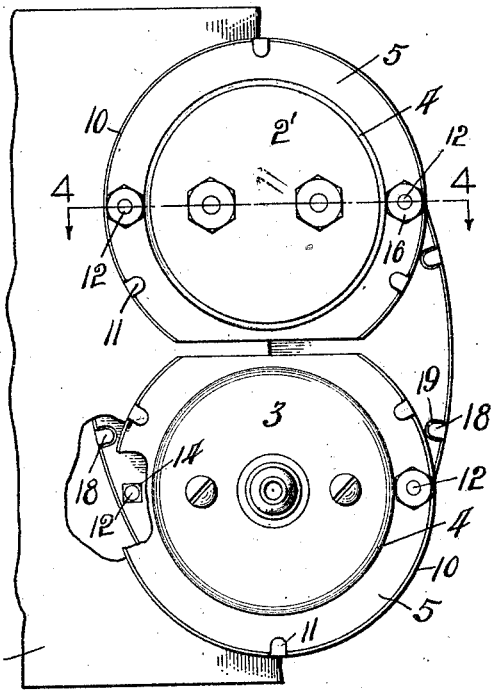
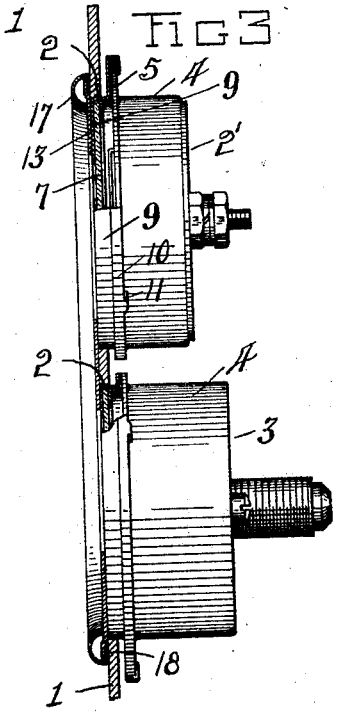
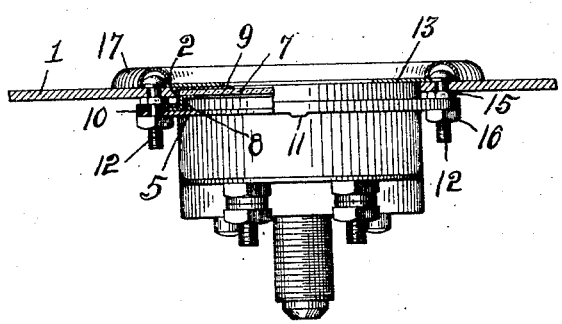
Inventor
Hugh L. Decker,
By Owen Owen & Crampton.
Attorneys Patented Aug. 18, 1925.

1,550,015

UNITED STATES PATENT OFFICE.

HUGH L. DECKER, OF TOLEDO, OHIO, ASSIGNOR TO THE W. G. NAGEL ELECTRIC COMPANY, OF TOLEDO, OHIO, A CORPORATION OF OHIO.

INSTRUMENT-MOUNTING MEANS.

Application filed April 23, 1924. Serial No. 708,487.

*To all whom it may concern:*

Be it known that I, HUGH L. DECKER, a citizen of the United States, and a resident of Toledo, in the county of Lucas and State of Ohio, have invented a new and useful Instrument-Mounting Means, which invention is fully set forth in the following specification.

This invention relates to automobile accessories, and has for its primary object the provision of means for securing a face plate and one or more instruments to the instrument board of an automobile, aeroplane or the like in a simple, efficient and rapid manner, and is particularly intended for use where a common face plate is provided at the front side of the instrument board for a plurality of instruments disposed at the rear side of the board.

The invention is fully described in the following specification, and while in its broader aspect it is capable of embodiments in numerous forms, a preferred embodiment thereof is illustrated in the accompanying drawings, in which,—

Figure 1 is a front fragmentary elevation of an instrument board with my invention associated therewith. Figure 2 is a rear elevation thereof. Figure 3 is a side elevation thereof with the parts in section, and Figure 4 is a section on the line 4—4 in Figure 2 with parts in full.

Referring to the drawings, 1 designates an instrument board of an automobile having one or more openings 2 therein, in the present instance two in number, and disposed one above the other, and 2' and 3 designate instruments which are disposed at the rear of the instrument board and the readings of which are made through the openings in the board.

Each of the instruments has a cup shaped case 4 open at its front to receive the instrument works and having an annular radial flange 5 at its front edge. The dial plate 6 of the instrument is substantially flush with the flange 5. A ring 8 of Z form in cross-section is mounted on the flange 5 in surrounding relation to the dial plate 6 of the associated instrument and with its outwardly projecting flange seating against the case flange. The inwardly directed flange of the ring 8 projects over the marginal edge of the dial plate and serves to maintain a lens or glass 7 in fixed relation to the dial plate and index finger which works thereover. An outer opaque, preferably sheet metal, plate 9 for the instrument is mounted over the glass 7 and is of cup form to seat down around the edge of the glass and the cylindrical portion of the ring 8, and has at its free edge an annular radial flange which clamps the outwardly projecting foot flange of the ring 8 to the case flange 5, and has at its outer edge a flange 10, which engages around the outer edge of the case flange 5 to center the plate 9, glass 7 and ring 8 with respect to the case. The edge of the plate flange 10 is provided at spaced intervals with ears 11 adapted to be bent under the edge of the case flange 5 to retain the parts in assembled relation. The radial flanges of the plate 9 and case 4 are perforated at intervals to receive bolts 12 by which they are securely clamped together, and which bolts also serve to secure the instruments to the instrument board, as hereinafter described.

The cup portion of the instrument face plate 9 of each instrument is adapted to project into the respective opening 2 of the dash board. The depth of the cup portion of the plate is somewhat greater than the thickness of the instrument board so as to provide a nut receiving space between the plate flange and the instrument board when the cut portion of the plate is projected entirely through the instrument board opening in flush relation to its front side.

A face-plate 13 is mounted over the outer side of the instrument board in position to cover the openings 2 therein and to project a desired distance marginally beyond such openings, such plate preferably being common to a plurality of adjacent openings 2. The plate is secured to the instrument board by the instrument attaching bolts 12, which project through marginally disposed openings in the plate 13, and the plate has an opening in register with the central opening of each face plate 9 to enable the dial of each instrument to be viewed therethrough. The openings of the two face plates 9 and 13, in the present instance, are shown as being of sectoral form with the openings of the plate 13 slightly larger than the openings of the plates 9. The shape of the plate openings, however, is not material to the invention.

The bolts 12 have their heads disposed at the outer side of the plate 13 in abutment therewith, and are provided adjacent to their heads with squared portions 14 (Fig. 2), which enter correspondingly shaped openings in the plate to prevent a turning of the bolts therein. After the bolts have been inserted through the plate 13 and respective openings of the instrument board 2, nuts 15 are threaded thereon in engagement with the inner side of the instrument board to securely clamp the plate 13 to the board. The instruments 2 and 3 are then mounted on the bolts 12 by projecting the bolts through the respective openings in the radially flanged portion of the instrument which includes the flange 5 of the case and the radial flange instrument plate 9. This having been done, the outer nuts 16 are threaded on the bolts against the case flange and serve to securely clamp the flanged portions of the instruments against the nuts 15 with the cut portion of the face plates 9 projecting into the respective instrument board opening 2 and against the face plate 13.

The heads of the bolts 12 are covered and the marginal edge portion of the face plate 13 is given a finished appearance by a rim or frame member 17 of channel form in cross-section, such frame or rim member corresponding in shape to the marginal shape of the face plate and having one edge seating against the face plate at the inner side of the bolts 12, and its other edge extending around the edge of the face plate and terminating in substantially flush relation to the rear side of such plate. The outer edge of the frame 17 is provided at intervals with tongues 18 adapted to be bent under and into registering seats or depressed portions 19 in the marginal edge portion of the rear side of the face plate, so that the tongues 18 when seated in the depressions 19 will stand substantially flush at their outer sides with the back of the plate, thus permitting the plate to seat closely against the instrument board.

It is apparent that I have provided a unitary arrangement and mounting for a plurality of instruments which enables a face plate for the instrument board and one or more associated instruments to be easily and quickly mounted on the board and at the same time gives a pleasing finished appearance to the mounting means.

I wish it understood that my invention is not limited to any specific construction, arrangement or form of the parts, or to the number of instruments used as it is capable of numerous modifications and changes without departing from the spirit of the claims.

Having thus described my invention, what I claim as new and desire to secure by Letters Patent is:—

1. Instrument mounting means, including a case formed to extend in an opening provided therefor in an instrument board, said case having a lens and a radial flange, a ring of Z-cross-section having its outwardly directed foot flange seated on said case flange and having its inwardly directed flange projecting over the front of the case and engaged with and beneath the lens thereof, a member mounted on the lens and having a cup-shaped part engaged about the edge of the lens and about the body of the ring, the cup-shaped part having a flange which clamps the foot flange of the ring to the case flange and also having an outer flange engaged about the edge of the case flange to center the lens and the ring relative to the case, the outer flange of the cup shaped part having ears bent about the case flange, a face plate having an opening in register with the case, bolts extending through the face plate and instrument board and through the flange of the cup-shaped part, the foot flange of the ring and the case flange, and a channeled rim disposed over the bolt heads and the face plate and engaged about the edge of the latter and having tongues bent into engagement with the rear side of the face plate.

2. Instrument mounting means, including a case formed to extend in an opening provided therefor in an instrument board, said case having a lens and a radial flange, a ring of Z-cross-section having its outwardly directed foot flange seated on said case flange and having its inwardly directed flange projecting over the front of the case and engaged with and beneath the lens thereof, a member mounted on the lens and having a cup-shaped part engaged about the edge of the lens and about the body of the ring, the cup-shaped part having a flange which clamps the foot flange of the ring to the case flange and also having an outer flange engaged about the edge of the case flange to center the lens, and the ring relative to the case, the outer flange of the cup shaped part having ears bent about the case flange, a face plate having an opening in register with the case, and means to rigidly connect the parts to the instrument board.

3. Instrument mounting means, including a case formed to extend in an opening provided therefor in an instrument board, said case having a flange, a ring having an outer flange seated on the case flange and having an inner flange spaced from the outer flange, a lens for the case seated on said inner flange, a plate seated on the lens and having a part engaged with the lens periphery and with the body of the ring and also having a part seated on the outer flange of the ring and a part engaged with the case flange, and means to rigidly connect the parts to the instrument board.

4. Instrument mounting means including a case formed to extend in an opening provided therefor in an instrument board, said case having a flange, a ring having an outer flange seated on the case flange and having an inner flange spaced from the outer flange, a lens for the case seated on said inner flange, a plate seated on the lens and having a part engaged with the lens periphery and with the ring, and means to rigidly connect the case flange, the ring and the face plate to the instrument board.

5. Instrument mounting means including a case formed to extend in an opening provided therefor in an instrument board, said case having a flange, a ring having an outer flange seated on the case flange and having an inner flange spaced from the outer flange, a lens for the case seated on said inner flange, means mounted on the lens and engaged with the periphery thereof to hold the lens in place, and means for rigidly connecting the case flange, the ring and the first named means to the instrument board.

6. Instrument mounting means including a case formed to extend in an opening provided therefor in an instrument board, said case having a flange, a ring having an outer flange seated on the case flange and having an inner flange spaced from the outer flange, a lens, for the case seated on said inner flange, a plate seated on the lens and having a part engaged with the periphery thereof and with the ring, a face plate seated on the first plate, bolts connecting the face plate, the case flange and the ring to the instrument board, and a channeled rim disposed over the bolt heads, and the face plate, and engaged about the edge of the latter and having tongues bent into engagement with the rear side of the face plate.

7. Instrument mounting means including a case formed to extend in an opening provided therefor in an instrument board, said case having a flange, a lens for the case, means seated on the flange to hold the lens spaced from the front face of the case, means mounted on the lens and engaging the periphery thereof and also engaging said first means to center the latter and the lens, and means engaging the case flange and the second named means to rigidly connect the parts to the board.

In testimony whereof I have hereunto signed my name to this specification.

HUGH L. DECKER.